April 2, 1935.  R. F. GIBBS  1,996,721
THERMOSTATIC MATERIAL AND METHOD OF MANUFACTURE THEREOF
Filed April 21, 1934

INVENTOR
Ralph F. Gibbs
BY
Horatio E. Bellows
ATTORNEY

Patented Apr. 2, 1935

1,996,721

UNITED STATES PATENT OFFICE 1,996,721

THERMOSTATIC MATERIAL AND METHOD OF MANUFACTURE THEREOF

Ralph F. Gibbs, Norton, Mass., assignor to The Improved Seamless Wire Company, Providence, R. I., a corporation of Rhode Island Application April 21, 1934, Serial No. 721,833

11 Claims. (Cl. 297—15)

My present invention relates to temperature controlling devices and has particular reference to thermostats and thermostatic materials.

It has been found that the production of a thermostatic element capable of efficient operation over a wide temperature range, and particularly at temperatures of from 500° to 1200° F., has been difficult, as the thermostatic elements are subject to jerky action and sluggish movement in the lower range of high temperatures, and to rupture and parting in the high temperature range.

It is the principal object of my invention to provide a thermostat which shall operate smoothly and effectively over a wide range of high temperatures, without separating or parting as a result of abrupt changes in stress of the thermostatic metals.

The thermostatic elements which are commonly used in manufacturing thermostatic material have heretofore been welded or integrally bonded in order to prevent parting of the elements during use. Since welding requires high temperatures and high pressures and a careful preparation of the contiguous surfaces of the materials, and bonding includes a bonding element which is welded to the other thermostatic elements, these methods of manufacture are relatively expensive. It is a further object of my invention to provide a thermostatic construction which utilizes solder, and which can operate over long periods of use with no loss or impairment of its physical and structural characteristics and properties.

It is an additional object of my invention to provide a thermostatic construction which eliminates abrupt changes in stress in the thermostatic metals, and thus produces a more flexible and smoother action so as to obtain a substantially uniform thermostatic movement over the entire operating range.

With the above and other objects and advantageous features in view, my invention consists of a novel method of manufacture and a novel arrangement of parts more fully disclosed in the detailed description following, in conjunction with the accompanying drawing, and more specifically defined in the claims appended thereto.

Figure 1:
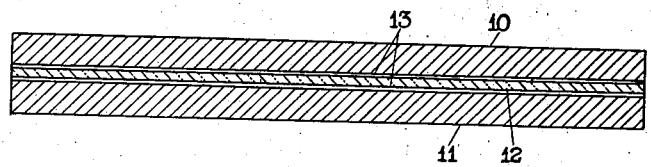
Fig. 1 is a longitudinal section through a strip of the novel thermostatic material.
Figure 2:
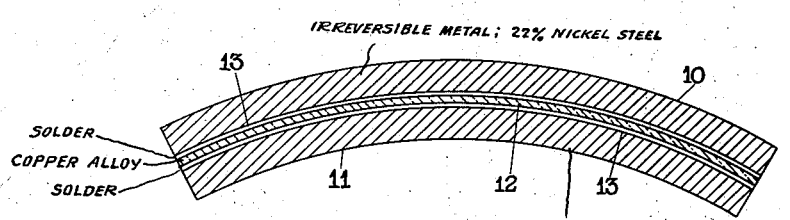
Fig. 2 is a view similar to Fig. 1 showing the arcuate position assumed by the thermostatic metals on increase of temperature.

It has been found desirable to provide a thermal responsive device which has a low manufacturing cost, and which will operate smoothly and uniformly over a high temperature range without separating and without loss of physical and structural characteristics and properties. I have therefore devised a thermal responsive device comprising three metallic elements, two of which are nickel steel containing different percentages of nickel, whereby one has an extremely low coefficient expansion and the other has an expansion suitable for the temperature range for which the thermostat is designed, the third element being a composition metal permanently secured between the first two elements by soldering.

Referring to the drawing, the novel thermostatic material comprises an upper layer 10 of irreversible metal, such as nickel steel having 22% nickel, and a lower layer 11 of reversible metal, such as nickel steel having 35 to 36% nickel for thermostats designed to operate at a temperature range less than 700° F., and 42% nickel for thermostats designed to operate at a temperature range above 700° F. An intermediate metal 12 is provided, preferably consisting of a composition of copper, zinc and tin, the preferred percentages being 85% copper, 2% tin and the remainder zinc; this metal has a high coefficient of expansion, a comparatively high melting point, and high tensile strength. The intermediate metal 12 is firmly locked to the layers 10 and 11 by solder 13, a preferred solder being hard silver solder containing not less than 17% fine silver, 20% nickel, 47% copper and the balance zinc.

It is thus evident that my novel thermostatic material includes a irreversible member of nickel steel, a reversible member of nickel steel having a coefficient of expansion suitable for the working range, and an intermediate member having a high coefficient of expansion, the intermediate member being locked between and to the irreversible member and the reversible member by means of solder. The novel thermostatic material is therefore of inexpensive manufacture, does not separate or part during use, and provides a greater expansion in the low range of the high temperature field and a smoother action throughout the high temperature field, particularly in the high range thereof. Moreover, the use of solder saves the natural grain structure of the elements because the small amount of the heat necessary to obtain the desired joining is not injurious to the grain structure.

Figure 3:
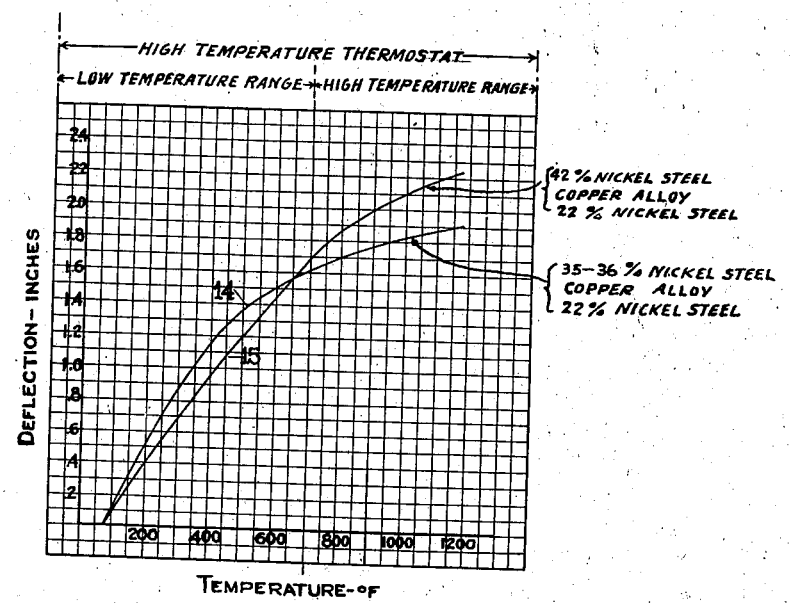
Fig. 3 is a diagrammatic chart of the deflection curves obtained with change of temperature.

I have found that the use of an intermediate member such as described above results in a more flexible and smoother action in the lower range of high temperatures, as from 300° to 500° F.; the thermostatic action is indicated by curves 14 and 15 of Fig. 3, the curve 14 corresponding to a 35%-36% nickel steel for the reversible layer 11 with a composition for the irreversible nickel steel material 10 of 22% nickel and the curve 15 corresponding to nickel steel containing 42% nickel for the reversible layer, the reversible layer being 22% nickel steel as before. Due to its expanding qualities the intermediate element is the first to act when heat is applied, and functions thermostatically with the irreversible nickel steel and physically against the reversible nickel steel until the applied heat reaches a temperature sufficient to cause expansive movement in the reversible element, whereupon the reversible element then works thermostatically with the other two. I have found that the described novel material may be cold rolled from ingots approximately .500 inch in thickness to .005 inch in thickness, and can be annealed for various degrees of hardness and heat treated by any of the commonly known methods, without change of physical and structural properties and without separation of the elements. I have also found that long use and frequent extreme changes between high and low temperatures have no effect upon the normal characteristics of the novel thermostatic material.

A suitable thickness for the completed thermostatic material is about .500 inch; the intermediate metal is preferably of approximately one tenth the combined thickness of the two nickel steel layers which are each approximately .250 inch thick.

While I have described a specific method of obtaining a thermostatic material, and specific metallic elements therefor, it is obvious that desired changes in the number of elements used, and in their composition, their size and their relative proportions, may be made to suit the requirements for different thermostats and for different working ranges and working conditions, without departing from the spirit and the scope of the invention as defined in the appended claims.

I claim:

1. A thermostatic strip comprising a layer of 35-36% nickel steel, a layer of 22% nickel steel, and an intermediate layer having a greater thermal coefficient of expansion than either nickel steel layer.

2. A thermostatic strip comprising a layer of 42% nickel steel, a layer of 22% nickel steel, and an intermediate layer having a greater thermal coefficient of expansion than either nickel steel layer.

3. A thermostatic strip comprising a layer of 35-36% nickel steel, a layer of 22% nickel steel, and an intermediate layer of copper alloy having a greater thermal coefficient of expansion than either nickel steel layer.

4. A thermostatic strip comprising a layer of 42% nickel steel, a layer of 22% nickel steel, and an intermediate layer of copper alloy having a greater thermal coefficient of expansion than either nickel steel layer.

5. A thermostatic strip comprising a layer of nickel steel containing about 22% nickel, a layer of nickel steel containing not less than 35-36% nickel, and an intermediate layer having a greater thermal coefficient of expansion than either nickel steel layer.

6. A thermostatic strip comprising a layer of nickel steel containing about 22% nickel, a layer of reversible nickel steel, containing not more than 42% nickel, and a brass element between said steel elements and having a greater coefficient of expansion than either steel element.

7. A thermostatic strip comprising a layer of nickel steel containing about 22% nickel, another layer of nickel steel, containing not less than 35-36% and not more than 42% nickel, and an intermediate layer of copper tin zinc alloy having a greater thermal coefficient than either nickel steel layer.

8. A thermal responsive device comprising three metallic elements, one being irreversible nickel steel containing a predetermined percentage of nickel and having an extremely low coefficient of expansion, another being reversible nickel steel containing a greater percentage of nickel and having a higher coefficient of expansion, and the third element secured between said nickel steel elements and having a higher coefficient of expansion than either.

9. A thermostatic strip for measuring temperatures from 500 to 1200 degrees comprising an irreversible nickel steel element of a predetermined coefficient of expansion, a reversible nickel steel element having a higher coefficient of expansion, and a brass element between said steel elements and having a greater coefficient of expansion than either steel element.

10. A thermostatic strip comprising a layer of nickel steel containing about 22% nickel, a layer of reversible nickel steel, containing not more than 42% nickel, and a layer of brass between said steel layers, said brass having a greater coefficient of expansion than either steel, said brass layer being joined to said steel layers by a joining metal having a melting point less than the melting point of brass.

11. A thermostatic strip for measuring temperatures from 500 to 1200 degrees comprising an irreversible nickel steel element of a predetermined coefficient of expansion, a reversible nickel steel element having a higher coefficient of expansion, and a brass element having a greater coefficient of expansion than either steel element and positioned intermediate said steel elements and secured thereto by a joining metal having a melting point lower than the melting point of the brass element.

RALPH F. GIBBS.